United States Patent [19]

Assenheimer et al.

[11] 4,124,005
[45] Nov. 7, 1978

[54] SUPPLEMENTARY AIR SUPPLY SYSTEM FOR AN INTERNAL COMBUSTION ENGINE

[75] Inventors: Jürgen Assenheimer, Vaihingen, Enz; Johannes Brettschneider, Ludwigsburg, both of Fed. Rep. of Germany

[73] Assignee: Robert Bosch GmbH, Stuttgart, Fed. Rep. of Germany

[21] Appl. No.: 796,909

[22] Filed: May 13, 1977

[30] Foreign Application Priority Data

May 15, 1976 [DE] Fed. Rep. of Germany ....... 2621670

[51] Int. Cl.² .............................................. F02M 7/24
[52] U.S. Cl. .................... 123/119 EC; 123/119 D; 123/124 B; 261/55; 261/56; 261/64 B; 261/64 C; 261/DIG. 74
[58] Field of Search ...... 123/119 EC, 32 EA, 32 AE, 123/119 D, 124 R, 124 B; 261/55, 56, 64 B, 64 C, 63, DIG. 74

[56] References Cited

U.S. PATENT DOCUMENTS

| 1,328,235 | 1/1920 | Lane | 261/64 C |
|---|---|---|---|
| 1,672,192 | 6/1928 | Aseltine | 261/64 C |
| 2,127,735 | 8/1938 | Hunt | 261/56 |
| 3,151,604 | 10/1964 | Walker et al. | 261/63 |
| 3,193,043 | 7/1965 | Korte | 261/63 |
| 3,198,498 | 8/1965 | Mennesson | 261/50 A |
| 3,319,944 | 5/1967 | Brenneman | 261/56 |
| 3,572,656 | 3/1971 | Oshima et al. | 261/65 |
| 3,669,424 | 6/1972 | Shiobara et al. | 261/63 |
| 3,836,128 | 9/1974 | Lunsford | 261/63 |

FOREIGN PATENT DOCUMENTS 2,219,880  10/1973  Fed. Rep. of Germany .... 123/119 EC

*Primary Examiner*—Tim R. Miles
*Attorney, Agent, or Firm*—Edwin E. Greigg

[57] ABSTRACT

The induction tube of an internal combustion engine is provided with an air flow measuring device which may be part of a carburetor and with a normal throttle valve, settable arbitrarily from the outside. A bypass channel conducts air around one or both of these elements and contains a flow restricting device. The induction tube further includes an air flow throttling mechanism for establishing a definite pressure drop across the inlet and terminus of the bypass to insure air flow therethrough even at full throttle and low rpm when the engine vacuum is low. The air flow throttling mechanism may be a pivoted baffle plate or a slide which enters the induction tube and partially blocks the air flow therethrough and which is moved by differential pressures in the induction tube. The slide retracts from the induction tube at full throttle and at high engine speed.

8 Claims, 2 Drawing Figures

SUPPLEMENTARY AIR SUPPLY SYSTEM FOR AN INTERNAL COMBUSTION ENGINE

BACKGROUND OF THE INVENTION

The invention relates to an apparatus for supplying supplementary air to the air induction tube of an internal combustion engine. The induction tube includes an air flow measuring device associated with a fuel-air mixture generator as well as an arbitrarily settable throttle valve and a bypass air line of variable cross section surrounding both of the elements in the induction tube.

In a known method for supplying a controlled amount of supplementary air in the above-described apparatus, the oxygen content of the exhaust gases is monitored and supplementary air is metered out through a bypass valve in dependence on the measured oxygen content of the exhaust gas. An electronic controller is used to receive signals related to the position of the throttle valve and the prevailing engine speed (rpm) so as to obtain a basic setting of the bypass valve which is then additionally adjusted in dependence on the signal from a device which measures the oxygen content of the exhaust gases. The controlled supply of air to a fuel-air mixture generated by a mixture generator may be admitted in principle through a bypass line which is parallel to the mixture generator or to the air flow rate measuring element but may also be admitted to a bypass line which is in parallel with the mixture generator and the throttle valve. The mixture generator is usually a carburetor having an air flow measuring member and a fuel dosing mechanism which meters fuel out in dependence on the measured air flow rate. In the first mentioned instance, i.e., when the bypass line goes around the mixture generator alone, the desired effect may not be achieved at engine idling speeds because there is practically no pressure difference available for supplying the additional air. The same is true for the second case whenever the engine is operated at full load and low rpm.

OBJECT AND SUMMARY OF THE INVENTION

It is a principal object of the present invention to provide an apparatus for supplying supplementary air into a carburetor bypass line which is effective in all operational domains, in particular at the extreme operating regions of engine idling and full-load operation at low rpm.

This and other objects are attained according to the invention by providing an apparatus of the general type described above which includes a throttling mechanism upstream of the normal throttle valve of the engine in the induction tube. The throttling mechanism is adjusted by differential pressure and causes a pressure drop between the inlet of the bypass line and its terminus in the induction tube even when the engine operates at low speed and when the throttle valve of the engine is fully opened. Thus there is always guaranteed a substantially constant minimum pressure drop between the inlet and terminus of the bypass line.

In one embodiment of the invention, the throttling mechanism is a baffle plate which can be displaced in opposition to a substantially constant force and which is located in a portion of the induction tube which diverges in the direction of air flow in the manner of a funnel. This produces a controllable and constant pressure drop which can be held to a minimum value.

In another favorable embodiment of the invention, the throttling mechanism is coupled to a member which is itself engaged, respectively, by the pressure upstream of the throttling mechanism and downstream of the main throttle valve as well as by a return spring. This arrangement reduces the additional flow resistance caused by the throttling mechanism. Accordingly, the maximum power at maximum rpm is not affected because, in this region of engine operation, the induction tube pressure downstream of the main throttle valve causes a complete elimination of the additional flow resistance by an appropriate adjustment of the throttling mechanism.

The invention will be better understood as well as further objects and advantages thereof become more apparent from the ensuing detailed description taken in conjunction with the drawing.

DESCRIPTION OF THE PREFERRED EMBODIMENTS

Figure 1:
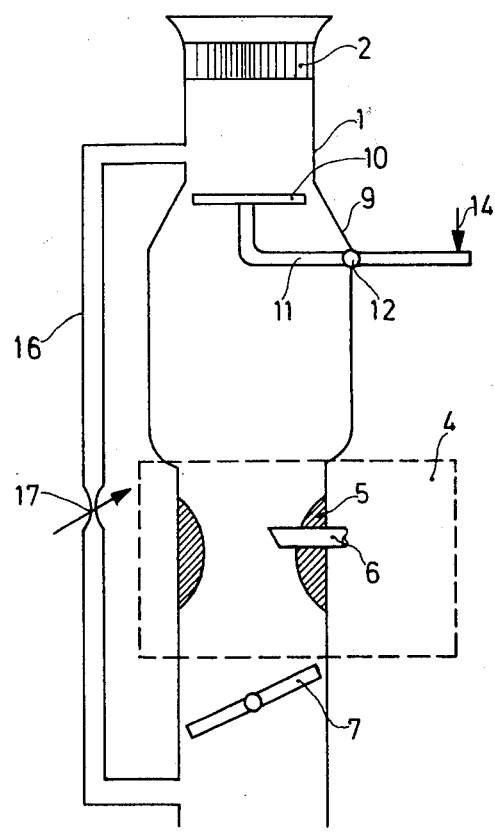
FIG. 1 is a schematic axial section of a first embodiment of the invention.

Turning now to FIG. 1, there will be seen a schematic representation of the induction tube 1 of an internal combustion engine, not further shown. In the usual manner, there is disposed at the inlet of the induction tube an air filter 2 while downstream thereof the induction tube contains a carburetor unit 4 which is depicted only schematically to include a fixed air passage or venturi acting as an air flow measuring device 5 and a fuel line 6. Downstream thereof, the induction tube encloses the usual arbitrarily settable main throttle valve 7. Up stream of the carburetor unit 4, the induction tube is enlarged in a funnel-shaped portion 9 in which region there is disposed a baffle plate 10 coupled to an arm 11 which pivots about a point 12 fixed in the induction tube wall. It will be appreciated that the air flow passing through the induction tube will tend to displace the baffle plate 10 against a restoring force, suggested by the arrow 14, which may be substantially constant.

Branching off from the induction tube between the air filter 2 and the funnel-like enlargement 9 is a bypass line 16 which terminates in the induction tube downstream of the throttle valve 7. The flow cross section of this bypass line is adjustable either manually or under automatic control at a point 17. This disposition permits, for example, the addition of a controlled amount of air through the bypass line for changing the mixture provided, for example, by a carburetor 4. As already proposed before, this may be done in so-called multiplicative fashion, i.e., by a multiplicative change of the throttle cross section in dependence on the air flow through the carburetor on the one hand and on the basis of an electric correction signal on the other hand. However, satisfactory function of the bypass air supply requires that there be present a sufficient pressure gradient between the inlet and outlet of the bypass line for all operational engine domains. When the bypass line bypasses both the carburetor and the main throttle valve 7, a critical operational domain is that of full-load operation at low rpm. In this domain, the engine vacuum is very small so that, after flow losses are considered, there is left only a very small effective pressure difference for controlling the supply of bypass air. It is a particular feature of the present invention that the baffle plate 10 intentionally provides an additional pressure difference as between the inlet side of the induction tube and the engine side of the induction tube downstream of the throttle valve 7. By providing a substantially constant restoring force acting on the lever 11 and by locating the baffle plate in a funnel-like diverging portion 9 of the induction tube, the pressure difference across the baffle plate 10 is small and substantially constant. The pressure drop is held small enough so that it is less than the induction tube vacuum occurring at full-load and maximum rpm. Thus, the maximum power of the engine is not substantially reduced, which is an advantage with respect to other flow resistances, such as orifices, etc., the resistance of which is a function of the flow rate.

It will be appreciated that, instead of a carburetor 4 as shown, another fuel supply system may have, in the same location, an air flow rate meter located between the throttle valve 7 and the baffle plate 10. In such a disposition, the flow rate meter measures the aspirated air quantity which, in turn, is used to meter out the correct amount of fuel at some other portion of the induction tube. The air quantity may then be controlled as previously described by controlling the flow cross section in the bypass line.

Figure 2:
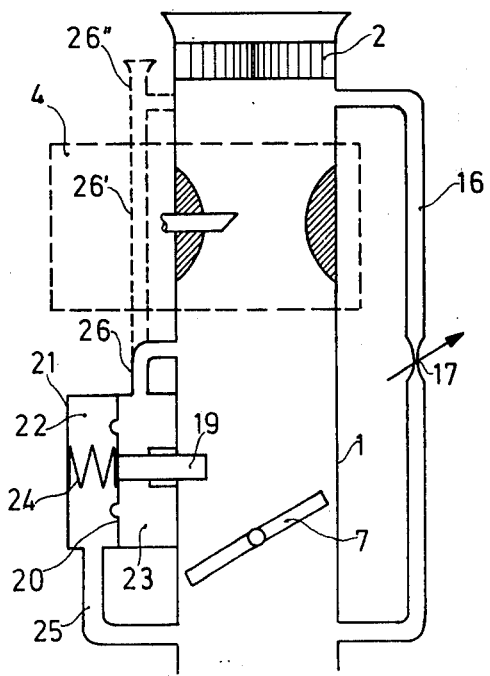
FIG. 2 is an illustration of a second exemplary embodiment of the invention.

The exemplary embodiment illustrated in FIG. 2 is a variant of that illustrated in FIG. 1 with several advantages. It includes, as before, an induction tube 1 with an air filter 2 and further includes a carburetor unit 4 and an arbitrarily settable main throttle valve 7. Bypassing the latter two elements is a bypass line 16 which branches off between the carburetor unit 4 and the air filter 2 and which terminates in the induction tube downstream of the throttle valve 7. As already described with respect to the first embodiment, the bypass line includes an adjustable throttle 17. By contrast to the example of FIG. 1, the present embodiment includes a slide 19 which extends into the induction tube and which is located between the carburetor unit 4 and the throttle valve 7. This slide 19 provides an increased flow resistance and an increased pressure drop across the bypass line. As already mentioned with respect to the first embodiment, the carburetor unit 4 may be replaced by an air flow rate meter which is used to meter out fuel. The slide 19, which may also be a piston or an adjustable orifice, etc., includes a control member, shown for this example as a control diaphragm 20. The control diaphragm 20 is affixed within a pressure box 21 and defines therein a work chamber 22 and a second chamber 23. The work chamber 22 includes a spring 24 which biases the control diaphragm 20 and the slide 19 in the sense of reducing the flow cross section of the induction tube 1. The work chamber 22 is connected through a line 25 to the induction tube 1 downstream of the throttle valve 7. The second chamber 23 is connected through a line 26 with the induction tube upstream of the slide 19. In one example of the embodiment of FIG. 2, the line 26 terminates in the induction tube between the carburetor unit 4 and the slide 19. In a variant thereof, illustrated in broken lines, the line 26' may terminate in the induction tube between the air filter and the carburetor unit. In a second variant, the line 26" may open directly into the atmosphere.

By supplying the chambers 22 and 23 with pressures as shown, the pressure drop across the slide 19 may be held constant and the magnitude of this pressure drop is higher in the variants of lines 26' and 26".

A substantial advantage of the embodiment of FIG. 2 is that the vacuum acting on the control diaphragm 20 increases when the engine speed (rpm) increases from a low value at a full-load position of the throttle valve 7. When the dimension of the spring 24 and the effective surface of the diaphragm 20 are suitably chosen, the slide is completely removed from the region of flow in the induction tube 1 at the very latest when full-load and maximum rpm are reached, i.e., in operational domains in which the maximum power of the engine is not to be affected. Thus, this mechanism becomes effective only in the lower portions of the full-load/rpm domain where it provides the desired pressure difference but does not change the maximum output power of the engine in the remaining operational domains of the engine in which sufficient pressure difference is available anyway.

An advantage of the embodiment of FIG. 1 with respect to that of FIG. 2 however, is that it permits the utilization of an air flow meter already present for producing the desired pressure drop if that flow meter operates on the principle of changing the cross section of the induction tube in response to a constant pressure difference. This may be done for example with the aid of a so-called CD (equal pressure) carburetor.

The foregoing relates to preferred embodiments of the invention, it being understood that other embodiments and variants thereof are possible within the spirit and scope of the invention.

What is claimed is:

1. An air supply system for an internal combustion engine, said engine including an air induction tube in which are disposed, seriatim, an air flow measuring device associated with a fuel-air mixture generator and an arbitrarily settable throttle valve, said air supply system including a bypass channel for air which has an inlet in and which terminates in said induction tube downstream of said throttle valve and which includes a variable flow-restricting element operated at least in part by an electronic mixture-correction signal, the improvement in said air supply system comprising:

air flow throttling means, disposed in said induction tube upstream of said throttle valve, for providing a pressure gradient between the inlet and the terminus of said bypass channel and operative after engine warm-up, said air flow throttling means being connected to sources of differential pressure to provide an adjustable throttling effect.

2. A system as defined by claim 1, wherein said air flow throttling means is the piston of a CD carburetor (equal pressure carburetor).

3. A system as defined by claim 1, further including movable means engaged by the pressure upstream of said flow throttling means and by pressure downstream of said throttle valve and by a spring, said movable means being connected to said air flow throttling means for actuation thereof.

4. A system as defined by claim 3, wherein said pressure upstream of said air flow throttling means is taken from upstream of said air flow measuring device associated with a fuel-air mixture generator.

5. A system as defined by claim 3, wherein said pressure upstream of said air flow throttling means is taken from said induction tube upstream of an air filter therein.

6. A system as defined by claim 3, wherein said air flow throttling means is a slide which enters said induction tube substantially transversely.

7. A system as defined by claim 3, wherein said air flow throttling means is a butterfly valve.

8. An air supply system for an internal combustion engine, said engine including an air induction tube in which are disposed, seriatim, an air flow measuring device associated with a fuel-air mixture generator and an arbitrarily settable throttle valve, said air supply system including a bypass channel for air which has an inlet in and which terminates is said induction tube downstream of said throttle valve and which includes a variable flow-restricting element operated at least in part by an electronic mixture-correction signal, the improvement in said air supply system comprising: air flow throttling means, disposed in said induction tube upstream of said throttle valve, for providing a pressure gradient between the inlet and the terminus of said bypass channel and operative after engine warm-up, and wherein said air flow throttling means is a baffle plate and wherein said induction tube has a funnel-shaped portion diverging in the direction of air flow wherein is disposed said baffle plate and including means for applying a substantially constant force to oppose the deflection of said baffle plate by the air flow through said induction tube.

* * * * *